United States Patent Office 3,714,335
Patented Jan. 30, 1973

3,714,335
PROCESS FOR PRODUCING HF AND
NITRILOTRIACETONITRILE
Paul Kobetz and Kenneth L. Lindsay, Baton Rouge, La.,
assignors to Ethyl Corporation, New York, N.Y.
No Drawing. Filed Jan. 29, 1971, Ser. No. 111,134
Int. Cl. C01b 7/22; C07c 131/42
U.S. Cl. 423—483                    8 Claims

ABSTRACT OF THE DISCLOSURE

It is disclosed that hydrofluoric acid and nitrilotriacetonitrile can be co-produced from fluosilicic acid, ammonia, formaldehyde and hydrogen cyanide. The fluosilicic acid typically is used in a preliminary reaction with ammonia and water to produce ammonium fluoride which is then reacted with formaldehyde and hydrogen cyanide coincidentally or in sequence. The product hydrofluoric acid is readily recovered by distillation leaving a co-product amine nitrile.

BACKGROUND OF THE INVENTION

Field of the invention

The invention relates to the manufacture of hydrofluoric acid and amine nitriles.

Description of the prior art

Prior art production of hydrofluoric acid is described in Kirk-Othmer, "Encyclopedia of Chemical Technology," second edition, 1966, vol. 9, pages 618–621, and 625. One process reacts $CaF_2$ and $H_2SO_4$ to produce HF and $CaSO_4$. Another process uses phosphate rock. These prior art processes involve certain difficulties with respect to the purity of product, availability of raw materials and the like.

SUMMARY OF THE INVENTION

The present invention relates to a process for producing hyydrofluoric acid from fluosilicic acid. To this end, fluosilicic acid and ammonium hydroxide are reacted at a temperature of from about 0 to about 200° C. at about atmospheric pressure or up to about autogenous pressure to produce ammonium fluoride and silicon dioxide. The ammonium fluoride thus obtained is then separated from the silicon dioxide as a solution, typically by decantation, filtration, or centrifugation, and it is reacted with formaldehyde and hydrogen cyanide at a temperature of from about 0 to about 100° C. to produce hydrofluoric acid and nitrilotriacetonitrile.

In one aspect of the present process the ammonium fluoride is preliminarily reacted with formaldehyde at a temperature of from about 0 to about 100° C. and then the product thereof is reacted with the hydrogen cyanide at a temperature of from about 0 to about 100° C. for from about one to about ten hours. Preferably the portion of the reaction with hydrogen cyanide is performed in a liquid-full system until all hydrogen cyanide is reacted. A preferred temperature range for the reaction of fluosilicic acid and ammonium hydroxide is at from about 50 to about 100° C., a typical temperature being about 80° C. The ammonium hydroxide is fed to the system as such or as liquid or gaseous $NH_3$ with the water being fed separately. The hydrogen cyanide is fed to the system as such in liquid or gaseous phase, preferably the former, or is generated in situ by feeding appropriate reactants; typically alkali metal cyanide such as sodium or potassium cyanide and fluosilicic acid which react to produce the HCN or the equivalent thereof for the reaction with ammonia.

A preferred narrower temperature range for the reaction of ammonium fluoride, formaldehyde and hydrogen cyanide is from about 25 to about 50° C. Reaction times for the steps of the present process, although important, are not critical and are determined largely by the time required for thorough contacting. In well agitated systems, several minutes are sufficient and longer periods up to several hours are usable.

Where the reaction of ammonium fluoride with formaldehyde and hydrogen cyanide is conducted in two steps as described in the foregoing, the preliminary reaction of ammonium fluoride and formaldehyde is preferably at a temperature of from about 0 to about 50° C. and the reaction of the product of the preliminary reaction with hydrogen cyanide is at a temperature of from about 50 to about 100° C.

Typically the reactants are used in stoichiometric proportions for the reactants involved; however, reasonable ranges of proportions to enhance limiting reactants or optimize yields include mol ratios based on the following proportion ranges.

|  | Mols | | |
| --- | --- | --- | --- |
|  | Broad | Preferred narrower | Typical |
| Ammonium fluoride | 1–3 | 1.8–2.2 | 2 |
| Formaldehyde | 3–9 | 5.5–6.5 | 6 |
| Hydrogen cyanide (or equivalent reactants to produce) | 3–9 | 5.5–6.5 | 6 |

The reactions are generally performed in an aqueous system containing at least enough water to maintain solutions of the soluble constituents except in those instances where release of a product is specifically desired. In general, the amount of water ranges up to about a 10-fold excess above the stated minimum for solubility. Larger amounts may be used; however, it generally is not economically advantageous to handle such dilute solutions.

The co-products hydrogen fluoride and nitrilotriacetonitrile are readily recovered in a simple distillation overhead from the nitrile of the hydrofluoric acid leaving a high purity nitrilotriacetonitrile co-product, itself a material of substantial value. Either or both co-products may be concentrated from dilute aqueous solutions. Typically, nitrilotriacetonitrile is useful as a chemical intermediate, for example, as a reactant with NaOH in the production of sodium nitrilotriacetate, which has useful sequestrant and detergent component properties. An alternate product recovery operation is by extraction with water or other appropriate solvents. Hydrofluoric acid is useful in numerous ways, as described in the Kirk-Othmer reference, a typical use being as catalyst in olefin alkylation reactions.

The following examples indicate preferred ways of carrying out the process of the present invention. The scope of the invention is defined in the claims and is not restricted to specific examples.

EXAMPLE I

A 250 ml. flask was provided with a heater and reflux condenser. Fuosilicic acid (10 grams) (33.3 grams of 30 percent aqueous solution) was added to the flask. An additional 25 ml. $H_2O$ was added. The flask was heated to reflux and $NH_4OH$ added slowly over a period of 5 minutes (14.7 grams of $NH_4OH$) (49 grams of 30 percent $NH_4OH$). A precipitate of $SiO_2$ formed, was removed by filtration and washed with water. The filtrate was added to benzene and the water boiled off as a benzene-water azeotrope. Resulting $NH_4F$ solids were washed with acetone and dried. The yield was 14.9 grams, theory being 15.4 grams. This corresponds to a 96.5 percent yield of ammonium fluoride which is good considering the scale involved.

A 200 ml. plastic flask equipped with a stirring bar and condenser was set up. Formaldehyde (5.0 grams in 10 ml. H$_2$O), ammonium fluoride (1.7 grams in 10 ml. water) and ammonium hydroxide (0.07 gram) (0.233 gram of 30 percent aqueous solution) was added.

HCN (4.4 grams) was produced by reacting NaCN and H$_2$SiF$_6$ in water. 39.6 grams of 30 percent H$_2$SiF$_6$ in water was cooled with ice and then 8.0 grams of NaCN slowly added (5 minutes). The resulting slurry was filtered to remove Na$_2$SiF$_6$. The residue was washed with two 10 ml. portions of water and added to the filtrate. This was added to the previous solution. The mixture was stirred 3 hours, then heated to 70° C. and stirred for an additional 4 hours. The mixure was cooled to room temperature. Crystalline material was obtained which was dissolved in 20 ml. acetone, filtered and the acetone removed. 5.0 grams of crystalline material ware obtained. I.R. confirmed the presence of nitrilotriacetonitrile. Yield of NTN is approximately 77 percent. The water solution from above was acid showing HF.

EXAMPLE II

A 100 ml. glass flask equipped with a stirring bar, condenser and nitrogen blanket was set up. Formaldehyde (9 grams in 37 percent aqueous solution) and ammonium fluoride (1.1 grams in 10 ml. water) were then added.

HCN (2.7 grams) was produced by reacting 4.7 grams NaCN and 4.6 grams H$_2$SO$_4$ in 10 ml. of water. The mixture was added to the formaldehyde-ammonium fluoride solution over a 2 hour period. The resulting mixture was heated at 70° C. for 1 hour. Some precipitate formed. The mixture was cooled to room temperature. Additional precipitate formed. The resulting mixture was filtered and the precipitate obtained was washed with water. The crystalline product weighed 3.5 grams. It was analyzed by I.R. (infrared) and found to contain NTN and Na$_2$SiF$_6$. (The HF reacted with the glass and Na$_2$SO$_4$ from the NaCN and H$_2$SO$_4$.)

EXAMPLE III

Example I is repeated except no NH$_3$ is added. Similar desirable results are obtained.

EXAMPLE IV

Example I is repeated except 6.0 g. HCN is used. Similar desirable results are obtained.

EXAMPLE V

Example I is repeated with 99+ percent purity commercial HCN. Similar desirable results are obtained.

We claim:
1. A process for producing hydrofluoric acid from fluosilic acid and for producing co-product nitrilotriacetonitrile which comprises:
(a) reacting fluosilicic acid and ammonium hydroxide at a temperature of from about 0 to about 200° C. to produce ammonium fluoride and silicon dioxide,
(b) separating the ammonium fluoride from the silicon dioxide thus produced,
(c) and reacting the ammonium fluoride with formaldehyde and hydrogen cyanide at a temperature of from about 0 to about 100° C. to produce hydrofluoric acid and nitrilotriacetonitrile.
2. The process of claim 1 wherein the ammonium fluoride is preliminarily reacted with formaldehyde at a temperature of from about 0 to about 100° C. and then the product thereof is reacted with the hydrogen cyanide at a temperature of from about 0 to about 100° C. for from about one to about ten hours.
3. The process of claim 1 wherein step (a) is performed at a temperature of from about 0 to about 50° C.
4. The process of claim 1 wherein step (a) is performed at a temperature of about 80° C.
5. The process of claim 1 wherein step (c) is performed at a temperature of from about 25 to about 50° C.
6. The process of claim 2 wherein the preliminary reaction of ammonium fluoride and formaldehyde is at a temperature of from about 0 to about 50° C. and the reaction of the product of the preliminary reaction and hydrogen cyanide is at a temperature of from about 50 to about 100° C.
7. The process of claim 1 wherein the proportions of the reactants are:

| | Mols |
|---|---|
| Ammonium fluoride | 1–3 |
| Formaldehyde | 3–9 |
| Hydrogen cyanide | 3–9 |

8. The process of claim 1 wherein the hydrofluoric acid is recovered by distillation producing high purity nitrilotriacetonitrile co-product.

References Cited

UNITED STATES PATENTS

| 2,780,522 | 2/1957 | Gloss et al. | 23—88 |
| 3,128,152 | 4/1964 | Secord et al. | 23—153 |
| 3,195,979 | 7/1965 | Burkert et al. | 23—153 |
| 3,337,607 | 8/1967 | Wollensak | 260—465.5 A |
| 3,501,268 | 3/1970 | Laran et al. | 23—153 |

EDWARD STERN, Primary Examiner

U.S. Cl. X.R.

423—470, 339